United States Patent [19]
Soch et al.

[11] Patent Number: 5,324,944
[45] Date of Patent: Jun. 28, 1994

[54] INFRARED DETECTION SYSTEM AND METHOD WITH DISTRIBUTED SIGNAL AMPLIFICATION AND SAMPLING

[75] Inventors: Kevin L. Soch, Pauma Valley; Scott Evans, Encinitas, both of Calif.

[73] Assignee: Hughes Aircraft Company, Los Angeles, Calif.

[21] Appl. No.: 988,577

[22] Filed: Dec. 10, 1992

[51] Int. Cl.⁵ .......................................... H01L 27/144
[52] U.S. Cl. .................................. 250/338.3; 250/332
[58] Field of Search .............................. 250/338.3, 332

[56] References Cited

U.S. PATENT DOCUMENTS

| | | | |
|---|---|---|---|
| 4,418,335 | 11/1983 | Genähr | 340/565 |
| 4,740,700 | 4/1988 | Shaham et al. | 250/332 |
| 4,808,822 | 2/1989 | Manning et al. | 250/332 |
| 5,118,946 | 6/1992 | Smith | 250/352 |

*Primary Examiner*—Constantine Hannaher
*Attorney, Agent, or Firm*—W. C. Schubert; W. K. Denson-Low

[57] ABSTRACT

Individual processing cells are provided in close proximity to each detector element in an infrared detector array. Signals generated by the detectors in response to incident infrared radiation are converted to amplified voltages by their respective processing cells, with all of the cells sampling and holding their respective amplified signals simultaneously. The signals held by the various cells are then read out serially during the next cycle of alternating exposures and shadings by a rotating chopper. The amplified signals of all the cells are simultaneously reset at the beginning of each chopper cycle. The simultaneous sampling and holding allows all of the held pixel signals to represent equal periods of exposure or shading, while the local voltage conversion and signal amplification at each processing cell substantially improves the final signal-to-noise ratio.

10 Claims, 3 Drawing Sheets

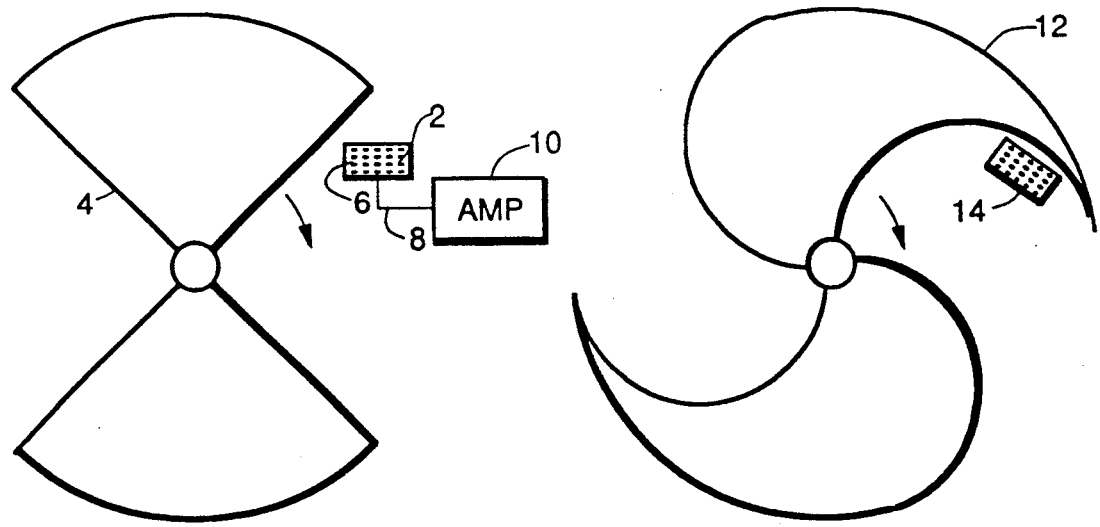
FIG. 1.
(PRIOR ART)
FIG. 2.
(PRIOR ART)
FIG. 3.
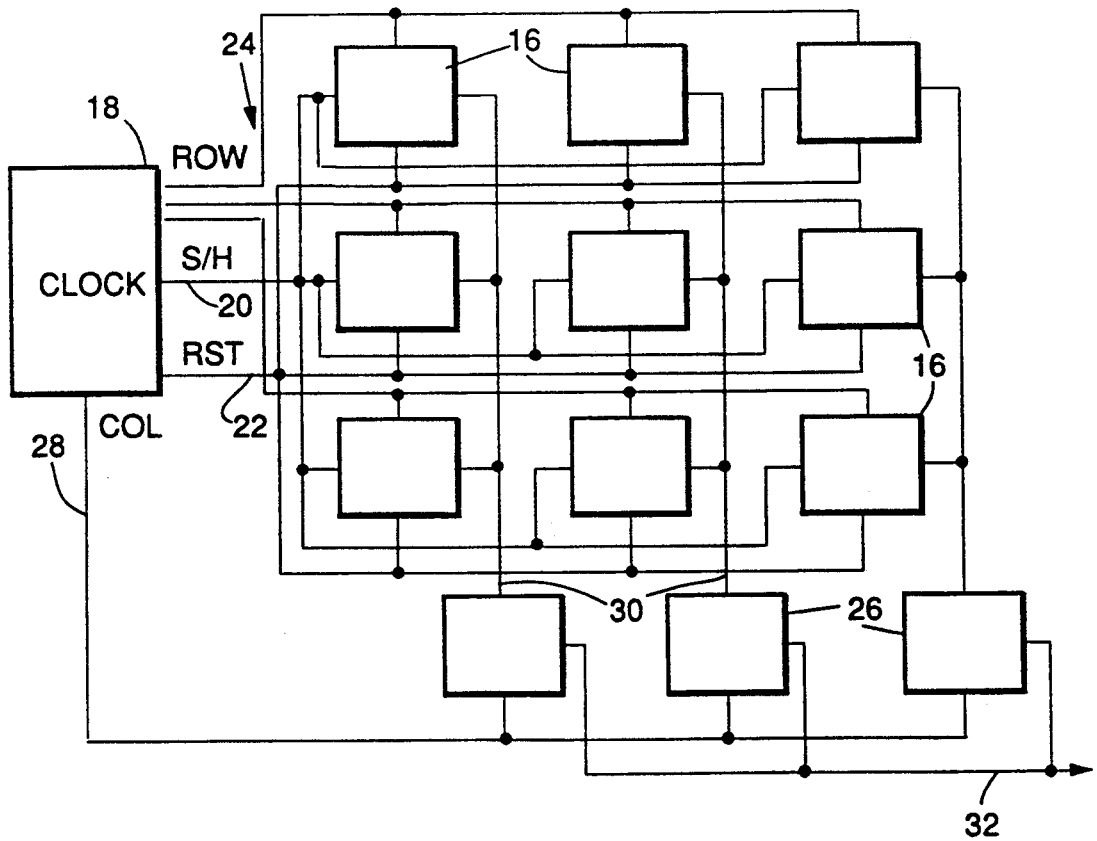

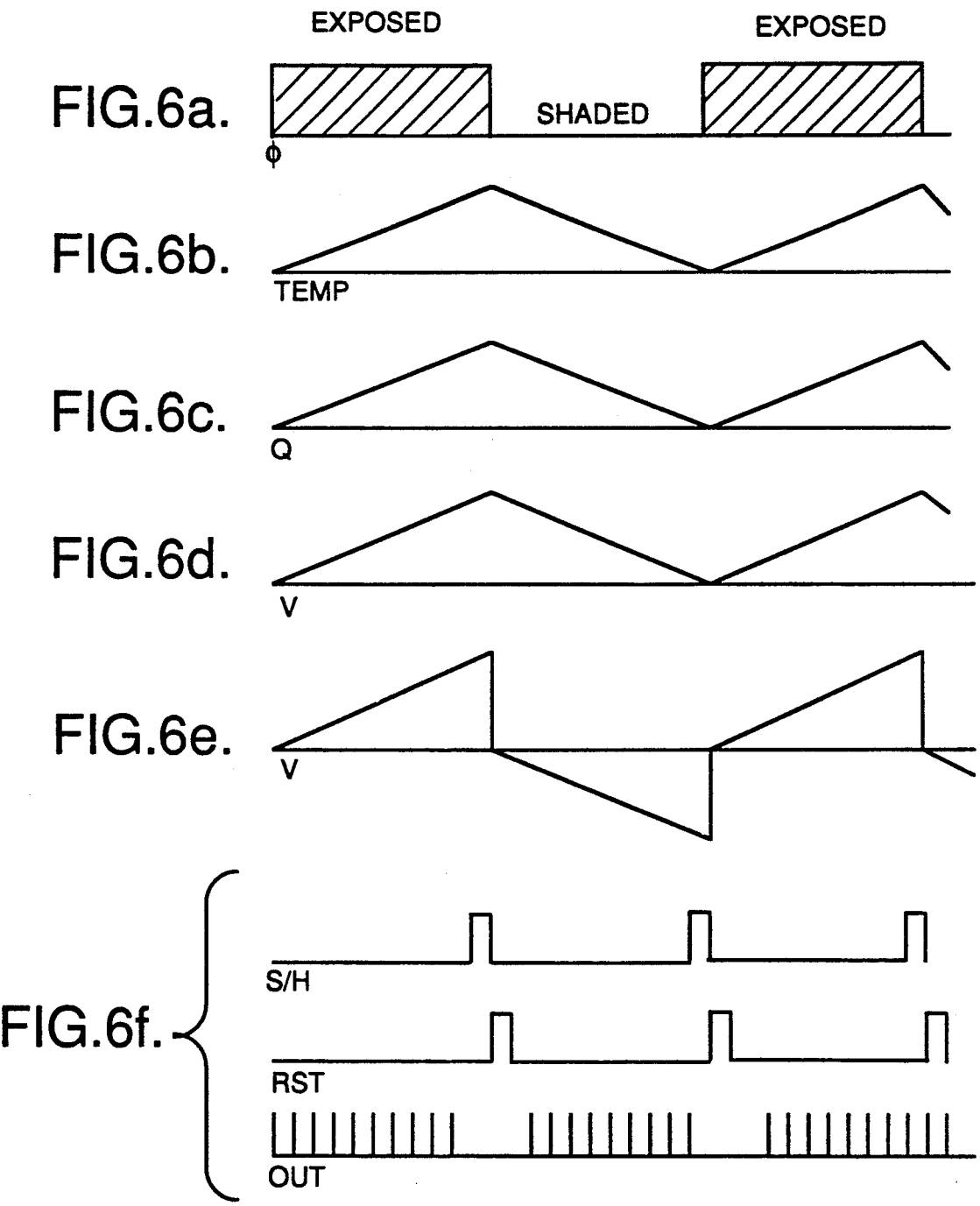

INFRARED DETECTION SYSTEM AND METHOD WITH DISTRIBUTED SIGNAL AMPLIFICATION AND SAMPLING

BACKGROUND OF THE INVENTION

1. Field of the Invention

This invention relates to the detection of infrared (IR) radiation, and more particularly to infrared sensor arrays in which readouts are obtained serially from individual pixel sensors within the array.

2. Description of the Related Art

Pyroelectric focal plane arrays detect patterns of incident IR radiation with an array of pyroelectric elements that produce an electrical charge when heated. The charge generated by each pixel corresponds to the amount it is heated by the incident IR radiation. The individual pixel charges are converted to voltage signals at a remote location, and are then read out as an indication of the IR radiation pattern at the array.

A conventional system is illustrated in FIG. 1, in which an IR focal plane array 2 is alternately shaded and exposed to IR radiation by a rotating chopper blade 4 that has a pair of blade sections occupying opposed quadrants. An AC chopper is used because a DC voltage will tend to decay. The individual pyroelectric pixel elements 6 begin to heat up as soon as the blade has passed by and they are exposed to the IR radiation. Since the chopper blade is considerably larger than the detector array, all of the detector elements 6 are effectively exposed approximately simultaneously. The voltage signals generated from each pixel are read out serially while the array remains exposed. The readout is timed to commence just after the exposure begins, and continues until shortly before the next blade segment arrives to shade the array. The signals from each of the pixel elements are transmitted over a bus line 8 to an amplifying circuit 10 that converts the charge signals to voltage signals and amplifies them to provide an electrical replica of the IR scene.

When the array is shaded by continued rotation of the blade 4, the pixel voltages are reset and negative voltages accumulate as the pyroelectric pixel elements cool off. The array is again read out serially during the shaded phase, at the end of which the pixel voltages are again reset to zero in preparation for the commencement of another exposure cycle.

A drawback of the existing systems is that, since the pixels are readout serially, the first pixel is read when it has just begun to charge up, while the last pixel is read near its maximum charge. One approach towards resolving this problem has been to attempt to read out the pixel signals faster, and then normalize the remaining pixel-to-pixel signal discrepancies that result from the serial readout over time. However, there is a limit to the readout speed that can be obtained, especially for large arrays. 128×128 pixel arrays are typical, with the size of each pixel on the order of 50 microns × 50 microns. A noticeable time differential is required to read out each of these pixels serially.

Another approach towards compensating for the time delay between reading the first and last pixels has been to read the pixels in one direction while the chopper is open, and then read them in the reverse order while the chopper is closed. While this approach is interesting conceptually, it is undesirable to design multiplexers capable of reading out arrays in opposite directions. Much more complex designs are required, especially for larger arrays.

The chopper blade has also been modified in an attempt to compensate for the readout. As illustrated in FIG. 2, a spiral chopper blade 12 has been substituted for the quadrant chopper blade 4 of FIG. 1. The edge of the chopper blade 12 is configured to traverse substantially an entire row of pixels in the focal plane array 14 simultaneously, but to leave a time increment between the traversal of successive rows. Since the commencement of heating for each row is delayed somewhat compared to the immediately preceding row, the readout delays resulting from the serial readout can be somewhat mitigated. While this approach reduces the location sensitivity of the readout, it requires a large area and relatively expensive chopper blade, and also a very high phase accuracy.

A limitation of both of the chopping schemes described above is that the inherently low level native pyroelectric signal can become overwhelmed by the downstream electronic noise, seriously reducing the output signal-to-noise ratio and the system performance. The small amounts of charge produced by the pyroelectric detectors are distributed across relatively large bus line capacitances between the detector array and the amplifier circuit, and this imposes a further severe limitation upon the generated voltage.

SUMMARY OF THE INVENTION

The present invention seeks to provide an IR detection system and method that allows the pixels of an IR detector array to be read out serially, and yet produces output signals for the various pixels that correspond to equal IR exposure times, all without the need for complex choppers, reverse-order readouts or abnormally fast readouts. The invention further seeks to provide a high quality readout with a large signal-to-noise ratio, and to avoid the generation of large bus line capacitances that limit the electrical signal available for readout.

In the accomplishment of these goals, each IR pixel detector in an array has a respective processing cell that is located proximate to the detector, and preferably connected thereto by "bump" connectors. The electrical signal generated by each detector in response to received IR radiation is amplified in situ by its associated signal processing cell, and the amplified signal is sampled and held within the cell. The signals held by the array of cells are then read out serially while a rotating chopper blade shades the array. All of the amplified cell signals are preferably sampled simultaneously towards the end of an exposure cycle, so that the held signals represent equal exposure times for their associated pixels. Each of the cells is then simultaneously reset at the beginning of a transition between IR exposure and blocking modes. Since all of the detectors integrate incident IR energy simultaneously and for equal lengths of time, the prior need to compensate for the real-time serial readout that took place during active pixel charge accumulation is eliminated.

The various cells are connected with a readout circuit via a bus line network. Each of the cells further includes a buffer circuit for driving the readout circuit and the bus line capacitance, thus reducing capacitive losses associated with the bus lines.

These and other features and advantages of the invention will be apparent to those skilled in the art from the following detailed description, taken together with the accompanying drawings, in which:

BRIEF DESCRIPTION OF THE DRAWINGS

FIGS. 1 and 2 are illustrative drawings of prior chopper shaded IR detector arrays described above that respectively use radial quadrant and spiral chopper blades;

FIG. 3 is a schematic diagram of an IR detector array in accordance with the invention;

FIGS. 6a-6f are electrical, optical and temperature timing diagrams that illustrate the operation of the invention.

DETAILED DESCRIPTION OF THE INVENTION

Figure 4:
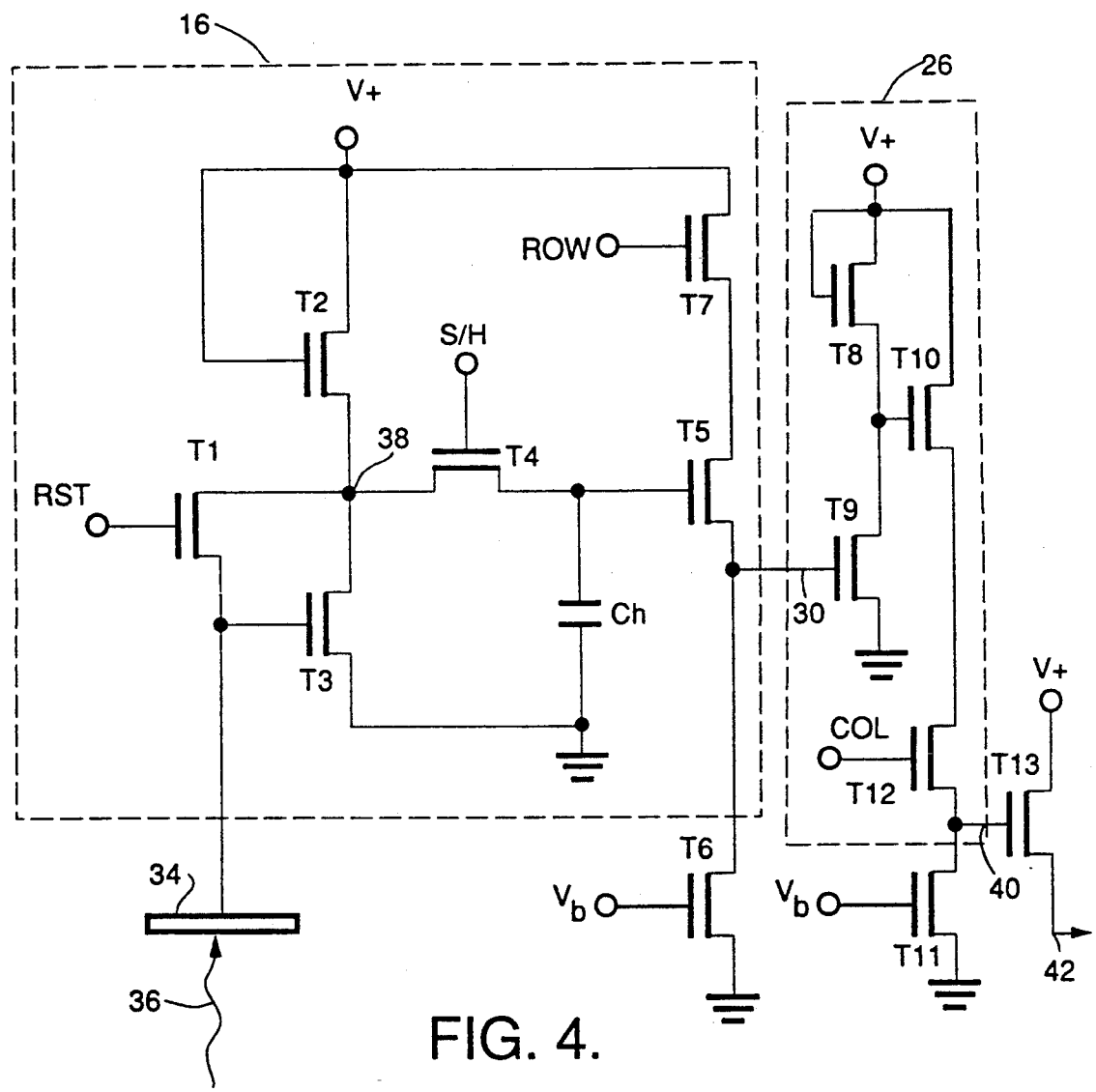
FIG. 4 is a circuit diagram of the detector cell circuitry employed by the invention.

FIG. 3 is a simplified schematic diagram of an overall IR detector array implemented in accordance with the invention. A series of processing cells 16, preferably organized in rows and columns, are distributed over the array. Each cell is located next to an associated IR detector. As discussed in further detail, the cells are preferably fabricated upon a single chip, with their associated IR detectors mechanically and electrically coupled to them by means of "bump" connectors. While only a 3×3 array is illustrated for simplicity, in practice 128×128 element arrays are conventional.

As opposed to prior IR detector arrays in which the charge accumulated by each detector is read out serially in real-time, with an accompanying error due to the differing charge periods for the different detectors at the times of the respective readouts, in the present invention the readout for all of the detectors is obtained for equal charging periods. This is accomplished by means of a clock 18 that accesses each of the cells through a sample-and-hold lead network 20 and corresponding sample-and-hold/amplification circuitry resident in each of the individual cells 16. At the end of a common charging period, which is preferably close to the full array exposure period provided by a conventional chopper such as those illustrated in FIGS. 1 and 2, the pyroelectric detector charge that has been locally converted to a voltage signal and amplified at each cell is sampled and held within its respective cell. Once they have been sampled and held for a subsequent readout, the amplified voltage signals within each of the cells are simultaneously reset to a known base voltage in response to a reset signal from clock 18 that is distributed to each of the cells in the array via reset network 22.

While the IR detector for each cell discharges in response to the chopper blade shading the detector array, the amplified voltage signals held by the cells are read out serially. This is accomplished in the preferred embodiment by actuating each row of cells in turn, and during the actuation of each row serially reading out the amplified voltage signal for each cell by means of a column scan.

The rows are actuated in succession in response to clock signals transmitted over a row transmission network 24. Separate output circuits 26 are provided for each column. During the actuation of each row, the column output circuits 26 are scanned by a clock signal delivered along a column line network 28. The signals held by each cell in an actuated row are supplied in succession by respective column output lines 30 to their respective column output circuits 26, which level shift the cell voltages up to a level suitable for readout. As each column output circuit 26 is probed in turn by the clock, the output from its respective cell in the actuated row is level shifted and supplied to a common array output line 32. After the first row has been read out serially, the subsequent rows are in turn actuated and read out column-by-column in a similar manner. While in FIG. 3 the "rows" are horizontal and the "columns" are vertical, these designations are arbitrary and can be interchanged.

Under the control of clock 18, the array readout is completed during the chopper blade's shading cycle. During that cycle the charge produced by the pyroelectric IR detectors progressively decreases, with a corresponding reduction in the amplified voltage signal for each cell. Toward the end of the shading cycle the signals held by each cell are updated by again sampling and holding all of the amplified cell voltages simultaneously. This is followed by a simultaneous reset of the amplified cell voltage signals, and a serial readout of the held cell signals as the IR detectors charge up again during the next chopper exposure cycle. This process continues, with the amplified cell voltage signals alternately ramping up and ramping down in response to their associated pyroelectric detector charges accumulating and depleting during blade exposure and shading cycles. The array signal pattern held during each cycle is read out during the subsequent cycle.

Details of a representative cell processing circuit 16 are given in FIG. 4. Its associated IR pyroelectric detector 34 produces an electrical charge in response to incident IR radiation 36. The detector 34 is connected via a reset switch, consisting of metal oxide semiconductor field effect transistor (MOSFET) T1, to a sampling node 38. The detector charge is converted to an amplified voltage signal at node 38 by means of a common source amplifier that is formed by a diode-connected load MOSFET T2 connected between a positive voltage source V+ and node 38, and a drive MOSFET T3 connected between node 38 and ground. The common source amplifier would typically have a gain on the order of about 10.

Node 38 is connected via a sample-and-hold MOSFET switch T4 to a holding capacitor $C_h$ that in turn supplies the gate of another MOSFET T5. This latter transistor is connected together with a MOSFET T6 in a source follower amplifier that provides unity gain and a high output drive to the cell's column output line 30. A row actuation switch is implemented by another MOSFET T7 that is connected between T5 and the positive voltage bus to enable an output from the cell when a row actuation signal has been received from the clock 18, and to disable the cell output at other times. The T5/T6 amplifier functions as a buffer to drive the busline capacitance and output circuitry, thus overcoming signal degradation from capacitive charge sharing and similar effects.

The cell output signal is transmitted over the column output line 30 to the column output circuit 26. There it is voltage shifted up to a level suitable for readout from the array (for example, from a 1 volt to a 3 volt level) by means of a level shifting circuit consisting of MOSFETs T8 and T9 connected in series. T8 has a diode connection with its drain connected to the positive voltage bus and its source connected to the drain of T9. Column output line 30 is connected to the gate of T9, whose source is grounded.

The level shifted signal is processed through a source follow amplifier consisting of a MOSFET T10 and a back-biased MOSFET T11 that are connected in series between the positive voltage bus and ground. A column MOSFET switch T12 is inserted between T10 and the amplifier's output line 40 so that an output is produced only when a column scan signal is received from the clock 18.

The column output line 40 is connected to a buffer MOSFET T13 that serves as a common output source follower for all of the columns in the array. A signal representing the output of the array is taken from an array output line 42 that is connected to the source of T13. Output line 42 carries the serial output signals from all of the cells in the array for each chopper cycle.

Figure 5:
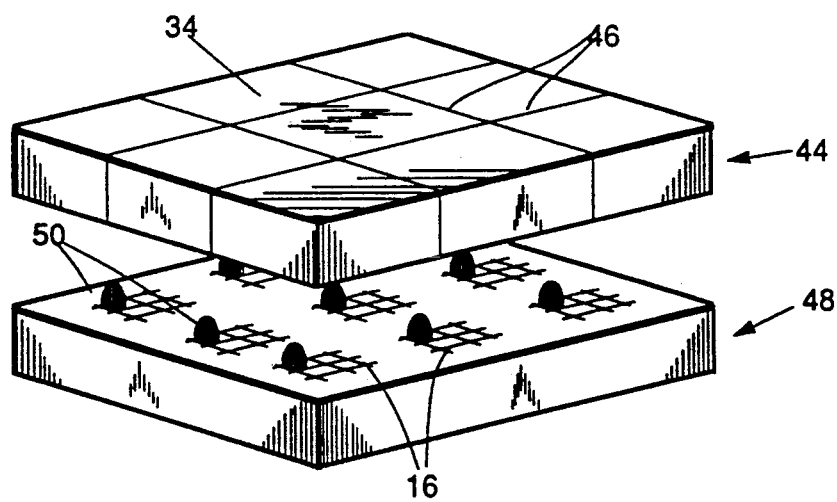
FIG. 5 is a simplified broken away perspective view of a detector array and its associated processing cells.

FIG. 5 illustrates a preferred mechanical implementation of the invention. An IR detector array 44 has individual pixel detectors 34 electrically isolated from each other by insulating barriers 46, and is fabricated on a single chip of a suitable pyroelectric material, such as lithium tantalate. The detector chip 44 is aligned over an array processor chip 48 upon which the individual cell processing circuits 16 and the column output circuits and output driver transistor (not shown) are fabricated. The detector chip 44 is shown spaced above the processor chip 48, but in practice it would be supported in close proximity to the upper surface of processor chip 48 with the individual pyroelectric detector elements 34 aligned immediately above their respective cell processing circuits 16. Electrical contacts between the cell circuit 16 and their respective detectors 34 are preferably made by means of indium "bumps" 50 that extend upward from the pixels on the processing circuits to contact and receive charge from their respective detector elements 34. In addition to providing a matrix of electrical contacts, the indium bumps 50 mechanically secure the detector chip 44 to the cell processing chip 48. They are preferably fabricated as disclosed in U.S. Pat. No. 4,740,700, assigned to Hughes Aircraft Company, the assignee of the present invention.

The operation of the IR detector array is illustrated by the graphs of FIGS. 6a-6f. FIG. 6a indicates the incident IR flux reaching the surface of a particular pixel detector 34 as the chopper blade rotates and the detector is alternately shaded and exposed to IR radiation. FIGS. 6b and 6c indicate the resulting temperature of the detector element, and the integrated charge which it develops. Both temperature and charge progressively increase during the expose cycle, and drop back to their starting points during the shaded cycle. While the temperature and charge traces are illustrated as linear segments, they would actually be approximately linear portions of exponential curves.

FIG. 6d represents the amplified voltage signal that is generated in a particular cell in response to the charge received from its associated IR detector, without the reset function. The voltage trace follows that of the charge trace in FIG. 6c. An amplified voltage trace that reflect the reset function is presented in FIG. 6e. After each exposure and shading cycle the amplified voltage signal is reset back to a reference value in response to transistor T1 closing and shorting together the voltage node 38 with the gate of the common source amplifier drive transistor T3 (FIG. 4). The reset voltage value is not necessarily zero, but rather depends upon the voltage threshold of the MOS10 FETs employed.

FIG. 6f illustrates the various clock functions. A sample-and-hold (S/H) pulse is produced near the end of each exposure and shading cycle, causing all of the processing cells 16 to simultaneously sample and hold their respective amplified voltage signals with their holding capacitors $C_h$. A reset pulse (RST) is then delivered simultaneously to all of the cells. The various cells are subsequently read out serially during the next exposure/shading cycle, as indicated by the output (OUT) trace in which each pulse represents a cell being read out.

The described IR detection system thus obtains pixel readings for all pixels simultaneously, thereby eliminating the discrepancies associated with the prior real-time serial pixel readout. It converts each detector elements charge to an amplified voltage signal locally at each cell to reduce the downstream amplification of transmission noise picked up by the pixel signals, and also buffers the output bus line capacitance and output circuitry to reduce associated capacitive losses. While an illustrative embodiment of the invention has been shown and described, numerous variations and alternate embodiments will occur to those skilled in the art. Such variations and alternate embodiments are contemplated, and can be made without departing from the spirit and scope of the invention as defined in the appended claims.

We claim:

1. An infrared detection system, comprising:
   an array of pyroelectric infrared detectors, respective signal processing cells associated with and located proximate to said detectors, each cell including:
   means for receiving an electric signal from its associated detector indicating the detection of infrared radiation,
   means for amplifying said received signal, and
   sample and hold means for sampling said amplified signal and holding the sampled signal,
   readout means for reading out the signals held by said signal processing cells as an indication of the infrared radiation received by their respective detectors, and
   means for periodically initiating a simultaneous updating of the signals held by each of said cells.

2. The infrared detection system of claim 1, wherein said readout means read out the signals held by said signal processing cells serially.

3. The infrared detection system of claim 2, further comprising means for periodically and simultaneously resetting the amplified signals of each of said signal processing cells to a reference value after each sampling of said signals but prior to each reading out of the held signals.

4. The infrared detection system of claim 3, further comprising a shutter means for periodically and alternately blocking said detectors from and exposing said detectors to infrared radiation, and means synchronizing said shutter means to switch from between blocking and exposing modes shortly after each sampling of said amplified signals, and in conjunction with the resetting of said amplified signals.

5. The infrared detection system of claim 1, said cells being connected with said readout means by a bus line network, each of said cells including buffer circuit means for driving said readout means to reduce capacitive losses associated with said bus lines.

6. An infrared detection system comprising:

an array of pyroelectric infrared detectors, respective signal processing cells associated with and located proximate to said detectors, each cell including:

means for receiving an electric signal from its associated detector indicating the detection of infrared radiation, means for amplifying said received signal, and sample and hold means for sampling said amplified signal and holding the sampled signal, readout means for reading out the signals held by said signal processing cells as an indication of the infrared radiation received by their respective detectors, means for periodically and simultaneously resetting the amplified signals of each of said cells to a reference value.

7. The infrared detection system of claim 6, said cells being connected with said readout means by a bus line network, each of said cells including buffer circuit means for driving said readout means to reduce capacitive losses associated with said bus lines.

8. A method of detecting a pattern of infrared radiation, comprising:

generating a pixel array of electrical signals corresponding to said infrared radiation pattern, individually amplifying each of said electrical signals to an amplified voltage level, individually sampling and holding said amplified voltage signals, serially reading out said sampled and held amplified voltage signals, periodically and simultaneously resetting said amplified voltage signals to a reference value, and repeating said sampling and holding and said serial read out for each successive resetting.

9. The method of claim 8, wherein each of said amplified voltage signals is sampled and held simultaneously.

10. The method of claim 8, wherein the signals sampled and held prior to reset are read out after the reset while a subsequent pixel array of signals is being generated.

* * * * *